R. E. KREUSER.
EMERGENCY BRAKE FOR VEHICLES.
APPLICATION FILED FEB. 3, 1916.
1,261,557.
Patented Apr. 2, 1918.
2 SHEETS—SHEET 1.
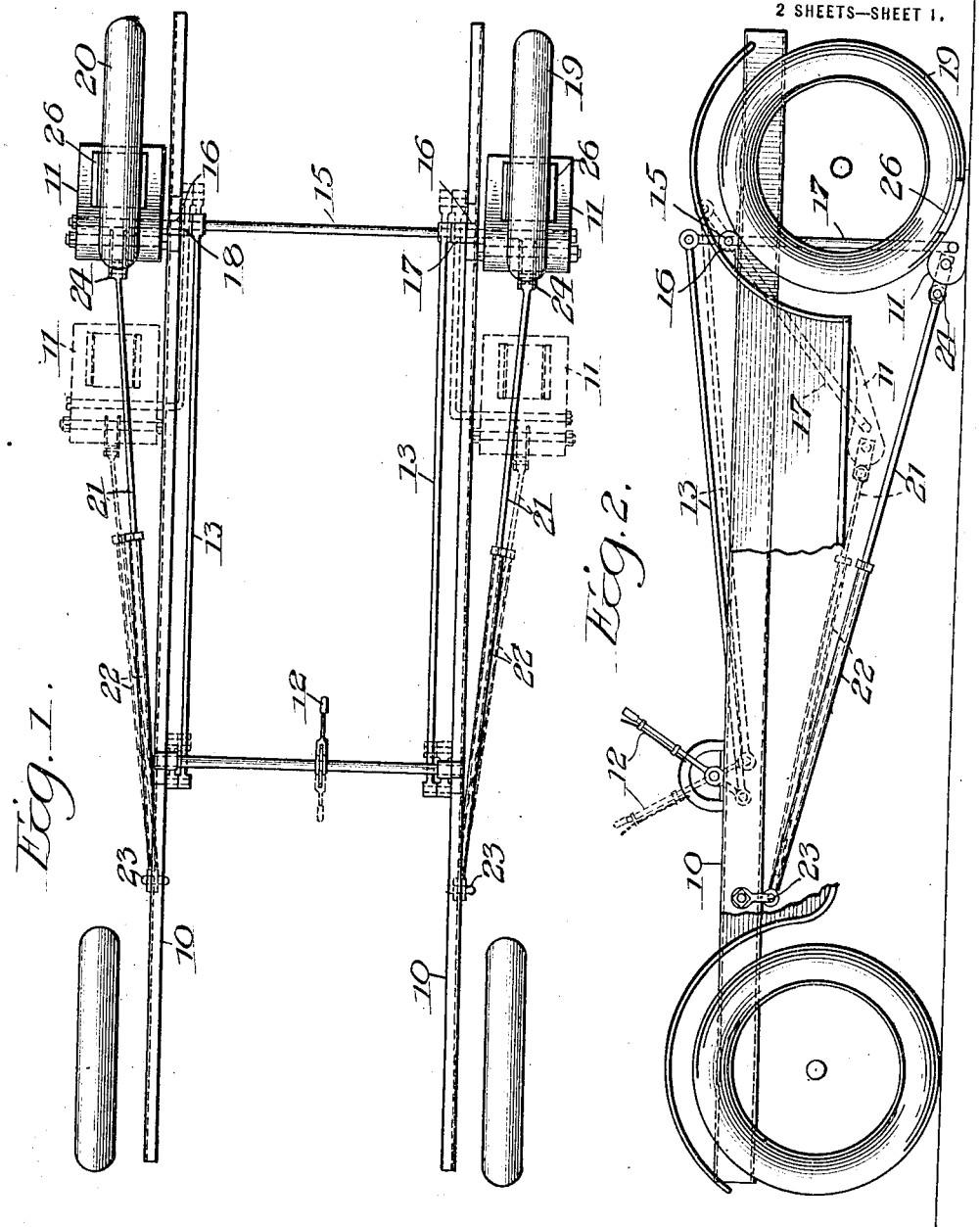
Inventor
Robert E. Kreuser
by Otto M. Wermich
atty R. E. KREUSER.
EMERGENCY BRAKE FOR VEHICLES.
APPLICATION FILED FEB. 3, 1916.
1,261,557.
Patented Apr. 2, 1918.
2 SHEETS—SHEET 2.
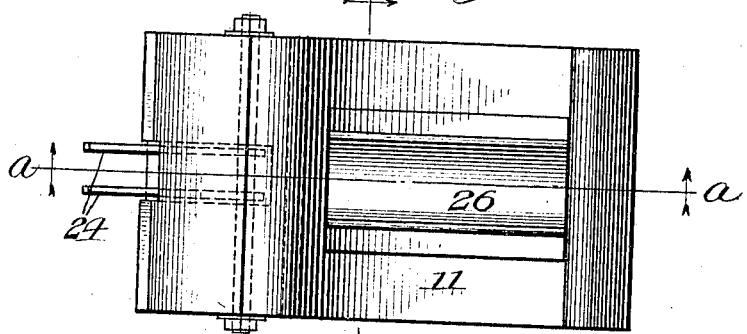
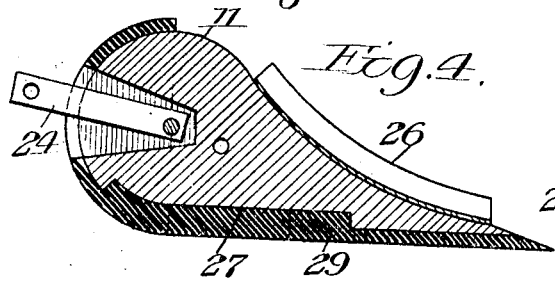
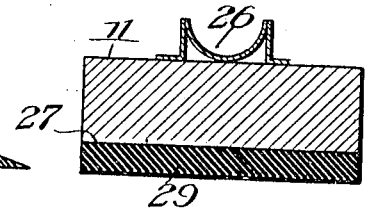
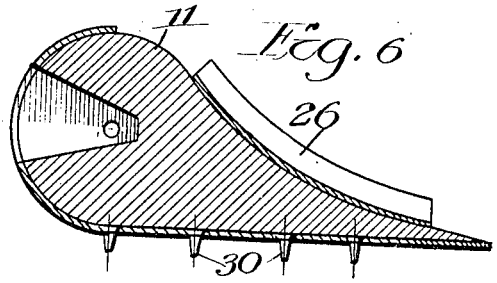
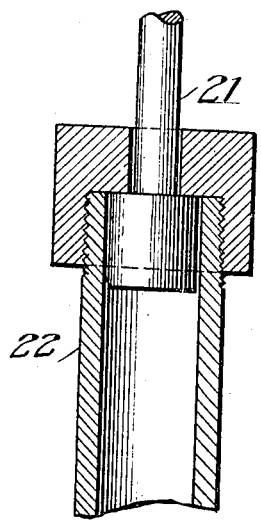
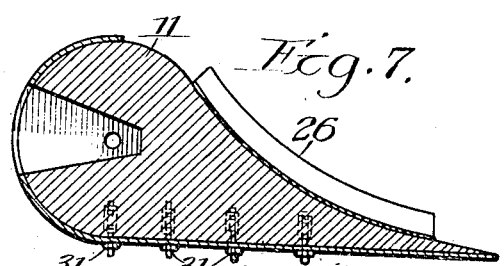
Inventor
Robert E. Kreuser
by Otto M. Wernich Atty

UNITED STATES PATENT OFFICE.

ROBERT E. KREUSER, OF CHICAGO, ILLINOIS.

EMERGENCY-BRAKE FOR VEHICLES.

1,261,557.   Specification of Letters Patent.   Patented Apr. 2, 1918.

Application filed February 3, 1916. Serial No. 75,893.

*To all whom it may concern:*

Be it known, that I, ROBERT E. KREUSER, a citizen of the United States, residing at Chicago, in the county of Cook and State of Illinois, have invented a certain new and useful Improvement in Emergency-Brakes for Vehicles, of which the following is a full, clear, concise, and exact description, reference being had to the accompanying drawings, forming a part of this specification.

The invention relates to emergency brakes for automobiles or other vehicles.

The object of the invention is the production of a device which may be interposed between the vehicle and the surface upon which the vehicle is being operated, the area of which is greater than that normally presented thereto, thereby increasing the frictional area which is presented to the pavement, to thereby cause the vehicle to be brought to a stop quicker, and thus reduce to a minimum the possibility of skidding and consequent collision with objects which are desired to be avoided.

I will explain the invention more in detail by referring to the accompanying drawings, in which—

Figure 1 is a top plan view of a chassis of an automobile showing my invention applied thereto;

Fig. 2 is a side view of Fig. 1 showing my device in operation and also an alternate position of the device in dotted lines;

Fig. 3 is a top plan view of a detail of construction;

Fig. 4 is a section on line *a—a* of Fig. 3;

Fig. 5 is a section on line *b—b* of Fig. 3;

Fig. 6 is a sectional view similar to Fig. 4 showing a modified construction;

Fig. 7 is another sectional view similar to Fig. 4, showing another form of construction, and Fig. 8 is a view of a detail of construction of the end of the connection rod.

Referring particularly to Figs. 1 and 2, I show my device as supported and carried by the chassis 10 of an automobile. In the preferred embodiment of my invention I contemplate the use of a member generally designated by the numeral 11 which is designed to be moved toward and away from the driving wheels of the vehicle while the same is in motion. In the construction shown in the drawings I utilize a pair of these members, one positioned in front of each of the rear driving or traction wheels. Both of these members are arranged to be moved from a position remote from the wheels to a position substantially beneath the same. The purpose and object of this will be apparent from the following:

These members 11 may be moved to their several positions by any convenient means. One form of mechanism by which this may be accomplished is shown in the drawings and includes the hand lever 12 and the connecting rod 13 which is secured at one of its ends to the lever 12 and has its opposite end connected to the rotatable cross rod 15 which is mounted upon and secured to the framework of the vehicle by means of the brackets 16—16 provided at the opposite ends of the rod 15. From this cross rod 15 depend the swinging rods 17 and 18 which produce a convenient means whereby the members 11—11 may be pivotally secured and carried, and brought into and out of their operative position with relation to the driving wheels 19 and 20.

A means is also provided whereby the pulling strain which is exerted upon the members 11—11 when in position for use may be transmitted to a substantial portion of the frame. This means consists of the telescopic members 21 and 22 which permit the members 11—11 to be easily moved from one position to the other, and also produces a means whereby the pulling strain may be transmitted directly to the frame of the machine.

It will be noted that the movement of these members is limited when the same are extended to the fullest extent, thus transferring the pull directly to said frame when this condition of the rods exists. The opposite ends of these members 21—22 are pivotally secured to the members 11 and the frame of the vehicle by the links 23 and 24 respectively. From the foregoing it will be evident that the members 11—11 may be actuated toward or away from the wheels 19 and 20 when occasion requires this to be done.

As before stated, the object of the invention is to interpose an element between the wheel and the pavement, which will augment the friction between the vehicle and the pavement and thereby reduce to a minimum the possibility of skidding when the brakes of the vehicle are applied. To gain this result I propose to utilize a member whose construction is such that when the same is positioned in proximity to the wheel, said wheel will be permitted to ride upon the member, and thus present a member to the pavement whose frictional surface is greater than that which would normally be presented by the surface of the ordinary vehicle tire. To increase the friction between the pavement and the member 11 said member may be provided with surfaces having various constructions. By referring to Fig. 3, it will be noted that the portion which is presented to the pavement is substantially greater in area than that presented by the ordinary vehicle tire, also that the contour of the member is such that the vehicle wheel will readily ride upon it when the same is presented thereto, even though the brakes have been applied and the revolution of the wheels is prevented. This last named advantage is gained by reducing the portion of the device 11 which is presented to the wheel. The member 11 is also provided with the channel shaped portion 26 which acts as a guide for the wheel to cause the same to properly engage said member. This portion 26 is securely fastened to the member 11 and prevents the device from becoming displaced by lateral movement of said members.

It will further be noted that the member 11 is substantially wedge-shaped in cross section, the smaller end being presented to the wheel while the larger portion is produced remote therefrom, also that the upper portion between the ends of said member conforms with the periphery of the wheel.

In the construction shown in Fig. 4 the lowermost face 27 is provided with a facing of rubber or other suitable material 29, which greatly adds to the frictional qualities of the device.

In the construction of the device 11 as illustrated in Figs. 6 and 7, the lowermost portions of the member 11 may be provided with the studs 30 or the section of chain 31 which are embedded in the rubber facing or may be fastened directly to the body portion of the member 11 as found desirable.

When the device is desired to be positioned for use, the members 11—11 will be caused to be brought from the position shown in dotted lines to the position shown in full lines in the drawings. This will present the members 11—11 to the wheels which at this time may have their brake applied or not. The device will operate successfully under either of the above named conditions. When the members 11 have been presented to the wheels the same will be caused to ride upon the upper surface thereof which will cause the telescopic members 21 and 22 to be extended to their limit and transfer the pull directly to the frame of the vehicle, and remove all the strains from the levers such as the lever 12, and connections thereto. At this time the members 11 will be interposed between the wheel and the pavement and as the frictional area of the members 11 is greater than that presented by the ordinary tire the vehicle will be caused to be brought to a stop quicker without the possibility of skidding and consequent collision with objects which are desired to be avoided.

It will be understood that various changes and modifications may be made with respect to the operating mechanism, and the members 11 without departing from the scope of the appended claims, and having explained in detail one form which my invention may take, what I claim and desire to cover by Letters Patent is:

1. The combination with a vehicle, of a shoe arranged to be interposed between the vehicle wheel and the surface upon which the vehicle is operated, said shoe being substantially wedge-shaped in section, the smaller portion of the wedge-shaped shoe being presented to the wheel, the under side of said shoe being provided with a surface for engaging the surface upon which the vehicle is operated, the upper face of the shoe being provided with a separate member to receive the vehicle wheel, said member substantially corresponding to the width of the wheel, and the wedge shaped member being greater in width than said member.

2. A shoe for the purpose described comprising in combination, a wedge-shaped member, the under side of which is provided with a suitable material for engaging the pavement, the upper face of said shoe being provided with a separate member to receive a wheel, said wedge-shaped member being greater in width than the member arranged upon the upper face of the shoe.

3. A shoe for the purpose described comprising in combination, a wedge-shaped member the under side of which is provided with a suitable material for engaging the pavement, the upper face of said shoe being provided with a separate member to receive a wheel, said member corresponding to the shape of the upper surface of the wedge-shaped member, and having a groove to receive a vehicle wheel, said wedge-shaped member being greater in width than the member arranged upon the upper surface of the shoe.

4. A shoe for the purpose described comprising in combination, a wedge-shaped member the under surface of which is provided with a suitable material for engaging the surface upon which the vehicle may be operated, the upper face of said wedge-shaped member being provided with a separate member arranged to receive a wheel, said member corresponding in contour to the upper surface of the wedge-shaped member and having a groove extending lengthwise thereof.

In witness whereof, I hereunto subscribe my name this 17th day of January, A. D. 1916.

ROBERT E. KREUSER.

Witnesses:
HAZEL A. JONES,
O. M. WERMICH.